US012583350B2

(12) United States Patent
Hau et al.

(10) Patent No.: US 12,583,350 B2
(45) Date of Patent: Mar. 24, 2026

(54) ELECTRIC VEHICLE BATTERY TEMPERATURE CONTROL FOR CHARGING VEHICLE FLEETS

(71) Applicant: GM Cruise Holdings LLC, San Francisco, CA (US)

(72) Inventors: Darren Hau, San Jose, CA (US); Kenneth Ferguson, Scottsdale, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 516 days.

(21) Appl. No.: 18/167,672

(22) Filed: Feb. 10, 2023

(65) Prior Publication Data

US 2024/0270107 A1      Aug. 15, 2024

(51) Int. Cl.
| | |
|---|---|
| *B60L 53/62* | (2019.01) |
| *B60L 53/302* | (2019.01) |
| *B60L 53/65* | (2019.01) |
| *B60L 53/66* | (2019.01) |
| *G05B 19/416* | (2006.01) |

(Continued)

(52) U.S. Cl.
CPC ............. *B60L 53/62* (2019.02); *B60L 53/302* (2019.02); *B60L 53/65* (2019.02); *B60L 53/66* (2019.02); *G05B 19/416* (2013.01); *G05D 7/0623* (2013.01); *H01M 10/443* (2013.01); *H01M 10/613* (2015.04); *H01M 10/615* (2015.04); *H01M 10/625* (2015.04); *H01M 10/63* (2015.04); *H01M 10/6567* (2015.04); *B60L 2240/545* (2013.01); *G05B 2219/37371*

(2013.01); *G05B 2219/50333* (2013.01); *H01M 2220/20* (2013.01)

(58) Field of Classification Search
CPC ........ B60L 53/62; B60L 53/302; B60L 53/65; B60L 53/66; B60L 2240/545; B60L 58/26; G05B 19/416; G05B 2219/37371; G05B 2219/50333; G05D 7/0623; H01M 10/443; H01M 10/613; H01M 10/615; H01M 10/625; H01M 10/63; H01M 10/6567; H01M 2220/20
See application file for complete search history.

(56) References Cited

U.S. PATENT DOCUMENTS

| | | | |
|---|---|---|---|
| 11,975,628 B1 * | 5/2024 | Pathipati ................. | B60L 53/66 |
| 2013/0029193 A1 * | 1/2013 | Dyer ................... | H01M 10/486 |
| | | | 180/65.21 |

(Continued)

FOREIGN PATENT DOCUMENTS

| | | | | |
|---|---|---|---|---|
| JP | 2022148126 A | * | 10/2022 | |
| WO | WO-2024092779 A1 | * | 5/2024 | ............. B60L 58/24 |

*Primary Examiner* — Santosh R Poudel
(74) *Attorney, Agent, or Firm* — Honigman LLP; Matthew H. Szalach; Jonathan P. O'Brien

(57) ABSTRACT

A heat transfer system regulates the flow of a coolant or heating fluid to the battery of an electric vehicle (EV). Heat transfer systems may be located at charging facilities for charging EVs in an EV fleet. A fleet manager may direct an EV to a particular charging facility to appropriately cool or heat the EV battery during charging; different charging facilities may have different heating or cooling capabilities. The fleet manager may oversee operation of the heat transfer systems, e.g., pre-heating or pre-cooling a heat transfer fluid based on predicted demand.

18 Claims, 9 Drawing Sheets

(51) Int. Cl.

| | |
|---|---|
| *G05D 7/06* | (2006.01) |
| *H01M 10/44* | (2006.01) |
| *H01M 10/613* | (2014.01) |
| *H01M 10/615* | (2014.01) |
| *H01M 10/625* | (2014.01) |
| *H01M 10/63* | (2014.01) |
| *H01M 10/6567* | (2014.01) |

(56) References Cited

U.S. PATENT DOCUMENTS

| | | | | |
|---|---|---|---|---|
| 2014/0148965 A1* | 5/2014 | Epstein | .................... | B60L 53/14 |
| | | | | 700/297 |
| 2017/0110770 A1* | 4/2017 | Marcicki | ............. | H01M 10/625 |
| 2019/0047429 A1* | 2/2019 | Torkelson | ........... | H01M 10/625 |
| 2019/0126766 A1* | 5/2019 | Taguchi | ................. | G06Q 50/40 |
| 2020/0317087 A1* | 10/2020 | Brinkmann | .............. | B60K 6/28 |
| 2020/0391601 A1* | 12/2020 | Maeshiro | ................ | B60L 53/16 |
| 2021/0188127 A1* | 6/2021 | Klose | ................. | H02J 7/00309 |
| 2021/0245627 A1* | 8/2021 | Ferguson | ............ | G05D 1/0291 |
| 2023/0048344 A1* | 2/2023 | Lee | ......................... | B60L 58/12 |
| 2023/0076816 A1* | 3/2023 | Salter | ..................... | B60L 53/37 |
| 2023/0159015 A1* | 5/2023 | Lee | ....................... | B60W 10/26 |
| | | | | 701/22 |
| 2024/0025301 A1* | 1/2024 | Park | ...................... | H01M 10/63 |

* cited by examiner

<u>100</u>

400

600

ELECTRIC VEHICLE BATTERY TEMPERATURE CONTROL FOR CHARGING VEHICLE FLEETS

TECHNICAL FIELD OF THE DISCLOSURE

The present disclosure relates generally to battery-powered electric vehicles fleets and, more specifically, to cooling or heating batteries of fleet vehicles while the batteries are being charged.

BACKGROUND

Electric vehicles (EVs) are powered by batteries that need to be periodically charged. For fleet operations, EV batteries must be frequently recharged so that the EVs can continue providing service. Dedicated charging facilities can be built to charge EV fleets. EV batteries typically have an ideal temperature range, and charging or driving EVs outside of this range can lead to battery degradation or lower performance. For example, operating an EV at too low a temperature can reduce the EV's range. As another example, charging an EV, especially using a fast charger, can raise temperature of the battery; if the battery becomes too hot, this can degrade the battery, e.g., decreasing the maximum charge level.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
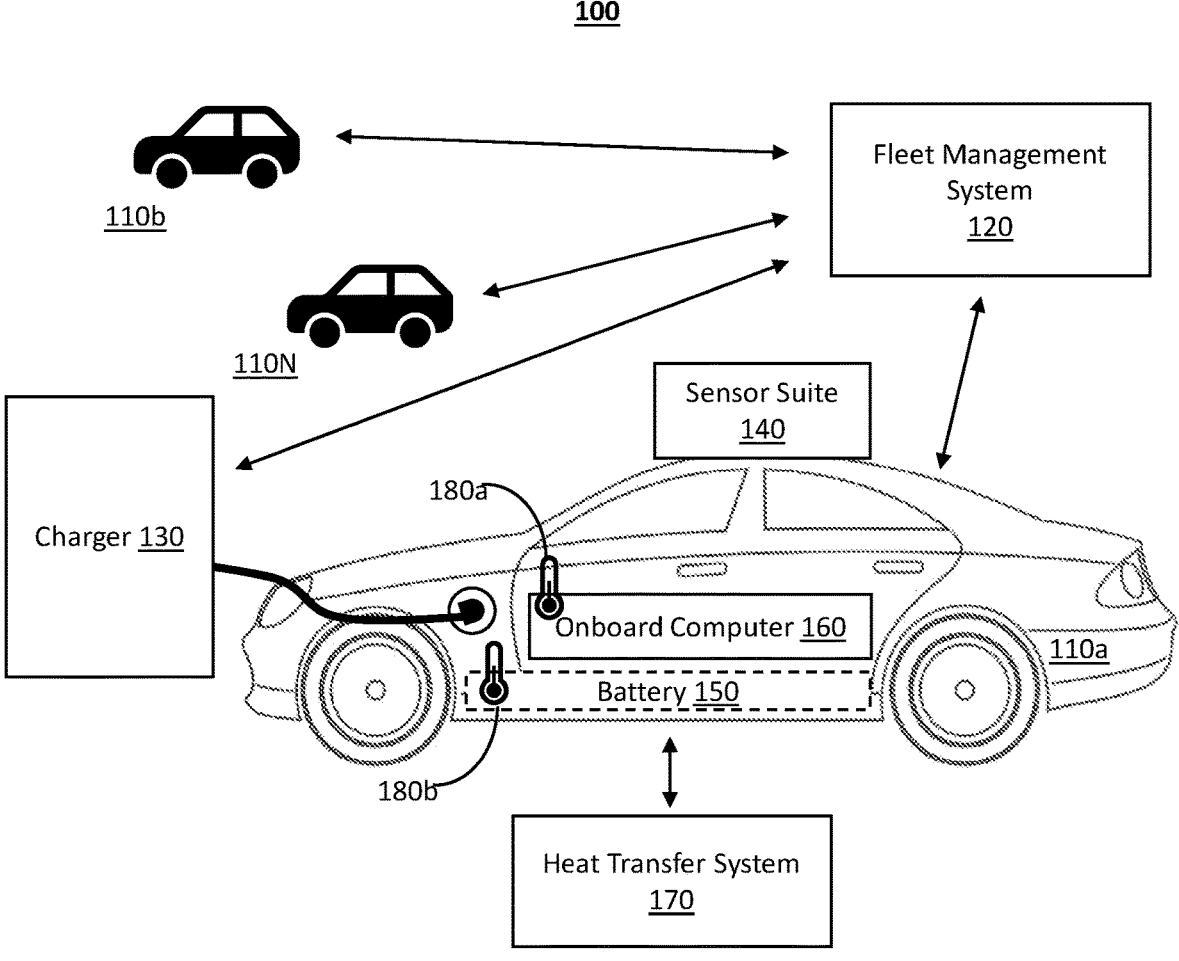
FIG. 1 is a diagram illustrating a system including an example fleet of EVs, where one EV is being charged at a charger while coupled to a heat transfer system, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

EV fleets often have high vehicle utilization. For example, in an autonomous EV fleet, a given autonomous EV may be fairly continuously engaged, e.g., providing a ride service or delivery service, moving to different locations to provide more optimal distribution, or charging. A given autonomous EV may be in operation for much of the time when services are requested, e.g., from 6 am to midnight or later, with breaks for charging when needed. For a fleet with high utilization, fast charging may be used to reduce the time that vehicles are out of service.

Heavy usage and fast charging of EVs can both lead to high battery temperatures, which can degrade the battery. For example, operating or charging the battery at high temperature can reduce the maximum current throughput of the battery, and can reduce battery life. Direct current (DC) fast charging, in particular, can lead to high battery temperatures, with excess heat generated by the combination of high currents and electric resistance. If battery temperature becomes too high, charging speeds may be significantly reduced to keep battery temperatures within a desired range. Furthermore, certain parts of the world have high ambient temperatures that can further increase battery temperatures, and lead to reduced charging speeds and/or battery degradation.

On the other end of the temperature spectrum, low battery temperature can have negative effects in EVs, such as loss of range. A portion of the range loss is due to changes in chemical reactions in the battery. Low temperature also increases the time it takes to charge an EV, by slowing current flow into the battery cells. Furthermore, charging at low temperatures can also lead to degradation; for example, charging lithium-ion batteries at low temperatures, especially when using a high-speed charger, can lead to lithium plating, which leads to permanent reduction in power and range.

As described herein, temperature control of EV batteries at charging facilities can reduce negative effects of too high and/or too low temperatures on batteries, particularly during battery charging. Charging facilities can have a heat transfer fluid that can be used to heat EV batteries, cool EV batteries, or heat or cool depending on need. The heat transfer fluid can be applied to the battery, e.g., through a fluid channel within an EV, or by immersing at least a portion of the battery in the fluid from below the EV. A charging manager and/or heat transfer manager can select a particular charging facility for an EV based on the battery temperature and the heat transfer fluid available at the charging facility, e.g., an autonomous EV can drive to a charging facility with cooling fluid if the EV's battery is hot, or if fast charging is desired. The heat transfer manager or charging facility can regulate flow of the heat transfer fluid into the EV or around the EV, e.g., based on the amount of heating or cooling desired and/or the amount of heat transfer fluid available at the facility. In some embodiments, the heat transfer manager may determine to pre-heat or pre-cool heat transfer fluid at a facility based on expected usage, expected electricity costs, or other factors.

As will be appreciated by one skilled in the art, aspects of the present disclosure, in particular aspects of temperature control of EV batteries, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example EV Fleet System with Heat Transfer System

The system 100 includes a fleet of electric vehicles (EVs) 110, including EV 110a, EV 110b, and EV 110N, a fleet management system 120, a charger 130, and a heat transfer system 170. For example, a fleet of EVs may include a number N of EVs, e.g., EV 110a through EV 110N. Some or all of the EVs 110 may be autonomous vehicles (AVs). EV 110a includes a sensor suite 140, a battery 150, and an onboard computer 160. EVs 110b through 110N also include the sensor suite 140, battery 150, and onboard computer 160. A single EV in the fleet is referred to herein as EV 110, and the fleet of EVs is referred to collectively as EVs 110.

In some embodiments, each EV 110 is a fully autonomous electric automobile. In other embodiments, each EV 110 may additionally or alternatively be another semi-autonomous or fully autonomous vehicle; e.g., a bus, a boat, an unmanned aerial vehicle, a driverless car, etc. Additionally, or alternatively, the EV 110 may be a vehicle that switches between a semi-autonomous state and a fully autonomous state and thus, the EV may have attributes of both a semi-autonomous vehicle and a fully autonomous vehicle depending on the state of the vehicle. In some embodiments, some or all of the EVs 110 are non-autonomous electric vehicles. In general, the EVs 110 may be any autonomous or non-autonomous rechargeable vehicle. For example, the EVs 110 may be rechargeable busses, trams, trucks (e.g., semi trucks, delivery trucks, etc.), construction vehicles, locomotives, golf carts, or scooters.

In embodiments where the EVs 110 are autonomous, each EV 110 may include a throttle interface that controls an engine throttle, motor speed (e.g., rotational speed of electric motor), or any other movement-enabling mechanism; a brake interface that controls brakes of the EV (or any other movement-retarding mechanism); and a steering interface that controls steering of the EV (e.g., by changing the angle of wheels of the EV). The EV 110 may additionally or alternatively include interfaces for control of any other vehicle functions; e.g., windshield wipers, headlights, turn indicators, air conditioning, etc.

The EV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUs), accelerometers, microphones, strain gauges, pressure monitors, barometers, thermometers, altimeters, ambient light sensors, etc. The sensors may be located in various positions in and around the EV 110.

An onboard computer 160 is connected to the sensor suite 140 and functions to control the EV 110 and to process sensed data from the sensor suite 140 and/or other sensors in order to determine the state of the EV 110. Based upon the vehicle state and programmed instructions, the onboard computer modifies or controls behavior of the EV 110. The onboard computer 160 may be a general-purpose computer adapted for I/O communication with vehicle control systems and sensor suite 140, but may additionally or alternatively be any suitable computing device. In some embodiments, the onboard computer 160 is or includes one or more high-performance computers or supercomputers. The onboard computer 160 is preferably connected to the Internet via a wireless connection (e.g., via a cellular data connection). Additionally or alternatively, the onboard computer 160 may be coupled to any number of wireless or wired communication systems.

The battery 150 is a rechargeable high voltage battery that powers the EV 110. The battery 150 may be a lithium-ion battery, a lithium polymer battery, a lead-acid battery, a nickel-metal hydride battery, a sodium nickel chloride ("ze-bra") battery, a lithium-titanate battery, or another type of rechargeable battery. In some embodiments, the EV 110 is a hybrid electric vehicle that also includes an internal combustion engine for powering the EV 110, e.g., when the battery 150 has low charge.

The EV 110 may include one or more temperature sensors for determining internal temperatures at various positions within the EV 110. In the example shown in FIG. 1, the EV 110 includes a first temperature sensor 180a in or proximate to the onboard computer 160 to detect the temperature of the onboard computer 160. Like the battery 150, the onboard computer 160 may have a range of temperatures at which the onboard computer 160 best operates, and a range of temperatures that may degrade the onboard computer 160. For example, too high of heat may degrade materials or components of the onboard computer 160. Furthermore, computing devices typically have improved operation (e.g., faster processing speeds) at lower temperatures.

The EV 110 includes a second temperature sensor 180b in or proximate to the battery 150. In some embodiments, the EV 110 includes temperature sensors at different locations around and/or within the battery 150. The current temperature of the battery 150 may be used to determine whether a heating or cooling fluid should be applied to the battery 150 during charging.

The EV 110 may include one or more additional temperature sensors. For example, the EV 110 may include an ambient temperature sensor to determine a temperature of the air outside the EV 110. The ambient temperature sensor may be mounted to an exterior of the EV 110. The EV 110 may further include one or more interior temperature sensors to determine a temperature of a passenger compartment, a delivery compartment, and/or other interior compartments of the EV 110.

The fleet management system 120 manages the fleet of EVs 110. The fleet management system 120 may manage a service that provides or uses the EVs 110, e.g., a service for providing rides to users with the EVs 110, or a service that delivers items, such as prepared foods, groceries, or packages, using the EVs 110. The fleet management system 120 may select an EV from the fleet of EVs 110 to perform a particular service or other task, and instruct the selected EV (e.g., EV 110a) to autonomously drive to a particular location (e.g., a delivery address). The fleet management system 120 also manages fleet maintenance tasks, such as charging and servicing of the EVs 110. As shown in FIG. 1, each of the EVs 110 communicates with the fleet management system 120. The EVs 110 and fleet management system 120 may connect over a public network, such as the Internet.

The charger 130 charges batteries of EVs 110. The charger 130 shown in FIG. 1 has a cord and a plug; the plug is plugged into a socket of the EV 110a. In other embodiments, the charger 130 is a wireless charger, e.g., an inductive charger, or another type of charger. The charger 130 may provide an alternating current (AC), such as an AC level 2 charger, or the charger 130 may provide a direct current (DC), which may deliver charge at a faster rate. A charging facility may include multiple chargers 130 to distribute power to multiple EVs 110 simultaneously. In some embodiments, a single charger 130 at a charging facility may charge two or more EVs 110 simultaneously.

The heat transfer system 170 uses a heat transfer fluid to transfer heat into or out of the EV battery 150, i.e., to cool down the EV battery 150 if it is hot or may become hot during charging, or heat the EV battery 150 if it is cold. The heat transfer system 170 may be in the same facility as the charger 130, e.g., at a charging facility. The heat transfer system 170 may be implemented in various ways, e.g., as illustrated in any of FIGS. 3-6. The heat transfer system 170 includes at least one fluid reservoir for the heat transfer fluid and a temperature regulator for regulating temperature of the heat transfer fluid. The heat transfer system 170 may include additional controls, such as flow controls to control the flow of the heat transfer fluid within the heat transfer system 170 and/or to a particular EV battery. Additional details about the heat transfer system 170 are described with respect to FIGS. 3-9.

The fleet management system 120 may be associated with a network of charging facilities that include one or more chargers 130 and one or more heat transfer systems 170. For example, an operator of the fleet management system 120 may provide multiple charging facilities, each including one or more chargers 130 and a heat transfer system 170. Charging facilities in the network may be distributed across one or more geographic regions in which the fleet of EVs 110 provides service. In some embodiments, EVs 110 may also use charging stations outside of the network operated by the fleet management system 120, e.g., charging stations available to the public, charging stations in private homes, charging stations on corporate campuses, etc. The fleet management system 120 may direct vehicles to particular charging facilities based on, e.g., geography, availability of chargers 130, and status (e.g., temperature) and/or availability of the heat transfer system 170. The fleet management system 120 may also control operations of the heat transfer system 170, e.g., to instruct a heat transfer system 170 to heat or cool its heat transfer fluid. The fleet management system 120 is described further in relation to FIG. 2.

Example Fleet Management System

Figure 2:
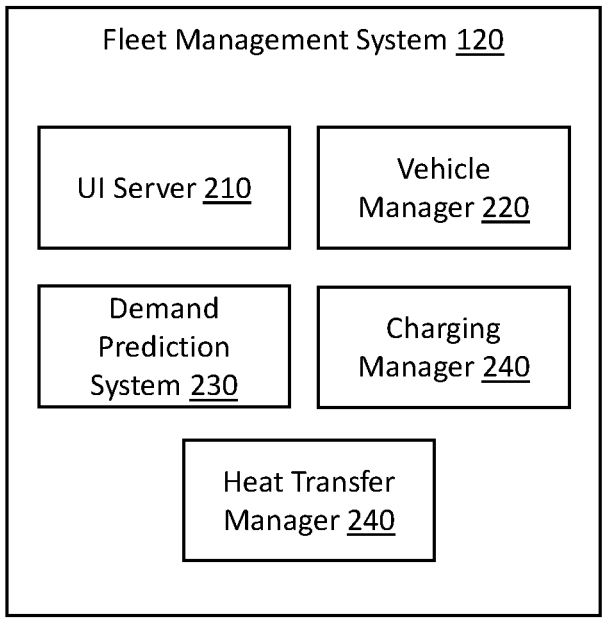
FIG. 2 is a block diagram illustrating a fleet management system according to some embodiments of the present disclosure.

FIG. 2 is a block diagram illustrating the fleet management system 120 according to some embodiments of the present disclosure. The fleet management system 120 includes a UI (user interface) server 210, a vehicle manager 220, a demand prediction system 230, a charging manager 240, and a heat transfer manager 250. In alternative configurations, different and/or additional components may be included in the fleet management system 120. Further, functionality attributed to one component of the fleet management system 120 may be accomplished by a different component included in the fleet management system 120 or a different system than those illustrated.

The UI server 210 is configured to communicate with client devices that provide a user interface to users. For example, the UI server 210 may be a web server that provides a browser-based application to client devices, or the UI server 210 may be a mobile app server that interfaces with a mobile app installed on client devices. The user interface enables the user to access a service of the fleet management system 120, e.g., to request a ride from an EV 110, or to request a delivery from an EV 110.

The vehicle manager 220 manages and communicates with a fleet of EVs, including EVs 110a through 110N. The UI server 210 transmits service requests received from users to the vehicle manager 220, and the vehicle manager 220 assigns EVs 110 to the service requests. More broadly, the vehicle manager 220 directs the movements of the EVs 110 in the fleet. The vehicle manager 220 may instruct EVs 110 to drive to other locations while not servicing a user, e.g., to improve geographic distribution of the fleet, to anticipate demand at particular locations, to drive to a charging facility for charging, etc. The vehicle manager 220 also instructs EVs 110 to return to EV facilities for recharging, maintenance, or storage. The vehicle manager 220 may receive data describing the current battery levels of the EVs 110 in the fleet, and based on the battery levels and current or predicted user demands, determine when EVs 110 in the fleet should be recharged.

In some embodiments, the fleet management system 120 includes a demand prediction system 230 that predicts a demand for the fleet of EVs 110. The demand prediction system 230 may retrieve historical data describing previous demands on the fleet of EVs 110, e.g., data describing numbers of assignments, durations of assignments, locations of assignments, and timing of assignments (day of week, time of day). The demand prediction system 230 uses this historical data to predict the demand for the fleet of EVs. In one example, the demand prediction system 230 predicts the demand levels for a period of time in the future, e.g., predicted demand over the next 5 hours, or predicted demand over the next 24 hours. In some embodiments, the demand prediction system 230 predicts an overall demand level or curve for the whole fleet, e.g., if the fleet is dedicated to one task (e.g., food delivery) and a particular region. In other embodiments, the demand prediction system 230 determines different demand levels or curves for various segments of the fleet, e.g., for a particular type of EVs (e.g., trucks, sedans, or luxury cars), for EVs within a particular geographic region, for EVs assigned to a particular function (e.g., EVs assigned to hot food delivery, EVs assigned to package delivery, or EVs assigned to giving rides to users), or a combination of factors (e.g., luxury cars used for a ride-sharing service within Austin, TX).

The vehicle manager 220 may use demand predictions from the demand prediction system 230 to assign EVs in the fleet to received assignments. For example, the vehicle manager 220 may instruct EVs to complete assignments, or to relocate in anticipation of predicted assignments, such that geographic distribution of the fleet can meet a predicted upcoming demand. A charging manager 240 may use demand predictions from the demand prediction system 230 to make charging decisions for the fleet of EVs, e.g., whether to maximize the number of EVs with a full charge due to a predicted high demand, or to allow some EVs in the fleet to be stored with emptier batteries while other EVs are placed in charging bypass mode to reduce strain and degradation of the batteries across the fleet.

The charging manager 240 manages charging of the EVs 110. The charging manager 240 may instruct an EV 110 to drive to a particular charging facility for charging. The charging manager 240 may receive from EVs 110 indicating current battery levels and determine that an EV 110 should drive to a charging facility for charging. The charging manager 240 may consider battery temperature and temperature control capabilities of a particular charging facility when assigning an EV 110 to charge at the charging facility. For example, if the EV 110 is coming out of storage in a cold location and the EV 110 has a cold battery, the charging manager 240 may instruct the EV 110 to drive to a charging station with a heat transfer system 170 that can heat the EV battery 150. In general, the charging manager 240 may coordinate charging across the fleet of EVs 110, taking various factors into consideration. For example, the charging manager 240 monitors use of and demand on a set of chargers 130 and instructs EVs 110 whether to charge based on the charging station demand. The charging manager 240 may also analyze various costs associated with charging at different rates and at different temperatures, and direct EV behavior based on such costs.

The heat transfer manager 250 manages heat transfer systems 170, e.g., heat transfer systems located at charging facilities. The heat transfer manager 250 may identify EVs for heating or cooling, and the heat transfer manager 250 may identify a heat transfer system 170 for heating or cooling the EVs. The heat transfer manager 250 may pass data or decisions to the charging manager 240, or vice versa; in general, the heat transfer manager 250 and charging manager 240 may work together to identify a charging facility and position within the charging facility for both charging an EV and heating or cooling the EV. The heat transfer manager 250 may, in some embodiments, be part of the charging manager 240. The heat transfer manager 250 is described further in relation to FIG. 8.

Example Heat Transfer Systems

Figure 3A:
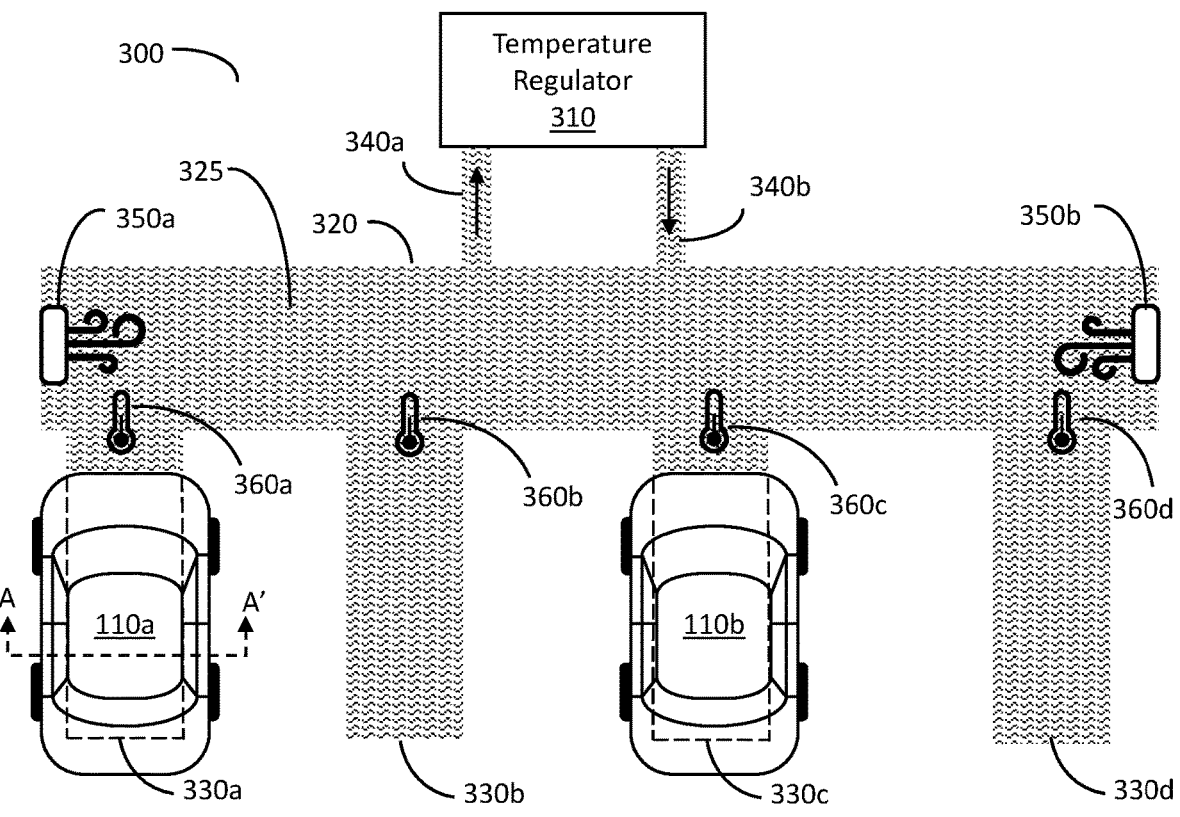
FIG. 3A is an illustration of a first example heat transfer system with a pool of heat transfer fluid, according to some embodiments of the present disclosure.

FIG. 3A is an illustration of a first example heat transfer system 300 with a pool of heat transfer fluid, according to some embodiments of the present disclosure. The heat transfer system 300 includes a temperature regulator 310 coupled to a reservoir 320, where the temperature regulator 310 regulates temperature of a heat transfer fluid 325 in the reservoir 320. The heat transfer fluid 325 may be a liquid with a high heat capacity, such as water or a water-based mixture. For example, the heat transfer fluid 325 may include ethylene glycol, diethylene glycol, propylene glycol, or betaine to adjust the temperature properties of the heat transfer fluid 325 (e.g., to lower the freezing point or raise the boiling point). The reservoir 320 may be insulated on one or more sides, or in some cases, on all sides. The reservoir 320 has several arms 330a, 330b, 330c, and 330d, and an EV 110 may be positioned at each of the arms 330. The heat transfer system 300 may be located in an EV facility, e.g., a charging facility. Each arm 330 may have an associated charger 130, not shown in FIG. 3.

The arms 330 are arranged so that an EV 110 can drive over one of the arms 330 and have the EV battery 150 partially submerged in the heat transfer fluid 325. For example, each arm 330 may be raised slightly (e.g., several inches) relative to the ground on either side of the arm 330, such that the EV battery 150, which sits higher than the base of the wheels, can be partially immersed in the heat transfer fluid 325. For example, a wheel track next to the sides of the arms 330 may be below a fluid level of the reservoir 320.

Figure 3B:
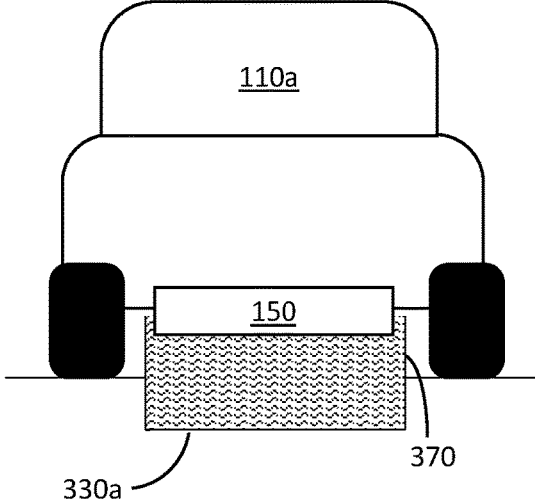
FIG. 3B is a cross-section of an EV with a battery immersed in the pool of heat transfer fluid of FIG. 3A, according to some embodiments of the present disclosure.

FIG. 3B illustrates an example cross-section labeled AA' in FIG. 3A. FIG. 3B illustrates a cross-section of the EV 110a having the battery 150, where a portion of the battery 150 is immersed in the reservoir 320, and in particular, in the arm 330a of the reservoir 320. As illustrated, the arm 330a has walls (e.g., the wall 370) that hold the heat transfer fluid 325 at a level that is higher than the base of the wheels. Thus, when the EV 110a drives over the arm 330a, the battery 150 can be cooled or heated by being partially immersed in the heat transfer fluid in the arm 330a.

Returning to FIG. 3A, the temperature regulator 310 is connected to the reservoir 320 by an input connection 340a (e.g., a first pipe) and an output connection 340b (e.g., a second pipe). Fluid flow directions are indicated by arrows. The temperature regulator 310 draws the heat transfer fluid 325 from the reservoir 320 and may heat or cool the heat transfer fluid 325 to achieve a desired temperature for the heat transfer fluid 325 in the reservoir 320. In some embodiments, the temperature regulator may either heat or cool. In some embodiments, the heat transfer system 300 may include a first temperature regulator for cooling, and a second temperature regulator for heating. The temperature regulator 310 may include a temperature sensor (e.g., a thermometer) to measure the temperature of water received from the input connection 340a.

The heat transfer system 300 may further include circulators 350 within the reservoir 320. In this example, two circulators 350a and 350b are mounted at either end of the reservoir 320. The circulators 350a and 350b may move the heat transfer fluid 325 within the reservoir 320 for better distribution of heated or cooled fluid, e.g., so that the temperature of the heat transfer fluid 325 is more consistent throughout the reservoir 320. In some embodiments, circulators 350 may be directed into or out of the arms 330 to distribute heated or cooled fluid from the temperature regulator 310 into the arms 330, or to move fluid heated or cooled by the EV batteries 150 out of the arms 330 and towards the temperature regulator 310.

The heat transfer system 300 may further include one or more temperature sensors 360 within the reservoir 320. The temperature sensors 360 measure temperature of the heat transfer fluid 325 at different positions within the reservoir 320. In this example, each arm 330 has a respective temperature sensor 360a, 360b, 360c, and 360d, to measure the temperature within each of the arms 330a, 330b, 330c, and 330d. These temperatures may be used (e.g., by the heat transfer manager 250) to determine which position to assign an EV 110. For example, if the battery 150 of the EV 110a is at a higher starting temperature than the battery of the EV 110b, EV 110a may be positioned at a relatively cooler arm (in this case, arm 330a) to provide greater cooling to EV 110a, and EV 110b may be positioned at a relatively warmer arm (in this case, arm 330c), since less cooling is needed.

Figure 4:
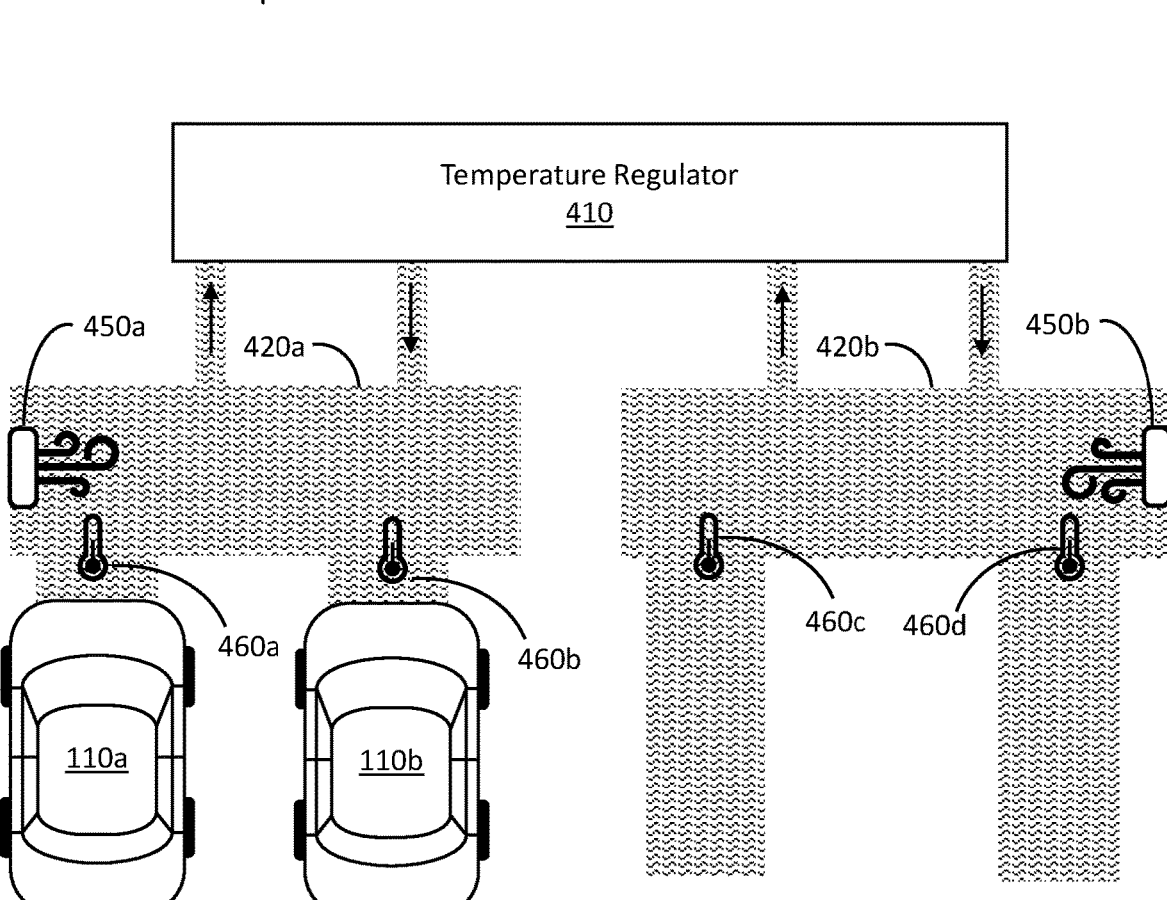
FIG. 4 is an illustration of a second example heat transfer system with multiple pools of heat transfer fluid, according to some embodiments of the present disclosure.

FIG. 4 is an illustration of a second example heat transfer system 400 with multiple pools of heat transfer fluid, according to some embodiments of the present disclosure. In this example, the heat transfer system 400 includes a temperature regulator 410 and two reservoirs 420: a first reservoir 420a, and a second reservoir 420b. The heat transfer system 400 may be located in an EV facility, e.g., a charging facility. The temperature regulator 410 is similar to the temperature regulator 310, and the temperature regulator 410 is coupled to each of the reservoirs 420a and 420b through a respective input connection and output connection, as described with respect to FIG. 3. In some embodiments, the two reservoirs 420a and 420b may each have a separate temperature regulator 410. The reservoirs 420a and 420b each include a respective circulator 450a and 450b, which are similar to the circulators 350a and 350b. The reservoirs 420a and 420b also each include a temperature sensor 460a, 460b, 460c, or 460d at each arm; the temperature sensors 460 are similar to the temperature sensors 360.

The reservoirs 420a and 420b are insulated relative to each other, and the heat transfer fluid in the reservoirs 420a and 420b may be at different temperatures. For example, one reservoir 420a may be set to a temperature for cooling hot batteries (e.g., batteries that are fast charging), and the other reservoir 420b may be set to a temperature for heating cool batteries (e.g., batteries coming out of storage). As another example, the temperatures may be different for different battery types or conditions, e.g., certain batteries may respond better to cooler heat transfer fluid than others. As another example, the reservoirs can be used at different times, e.g., if the heat transfer system 400 is used to cool batteries, the second reservoir 420b may have become too hot from use, and the temperature regulator 410 is cooling the heat transfer fluid in the second reservoir 420b. While the second reservoir 420b is being cooled down, the first reservoir 420a is used to cool the batteries of EVs 110a and 110b.

In this example, two EVs 110a and 110b are positioned at two respective arms of the first reservoir 420a. In one particular example, the first EV 110a is relatively cold (e.g., the second EV 110a is coming out of storage), while the second EV 110b is relatively hot (e.g., the second EV 110b is fast charging). The batteries of the two EVs 110a and 110b simultaneously cool and warm the heat transfer fluid in the reservoir 420a, which can result in the fluid in the first reservoir 420a maintaining a moderate temperature that continues to both heat the first EV 110a and cool the second EV 110b.

Figure 5:
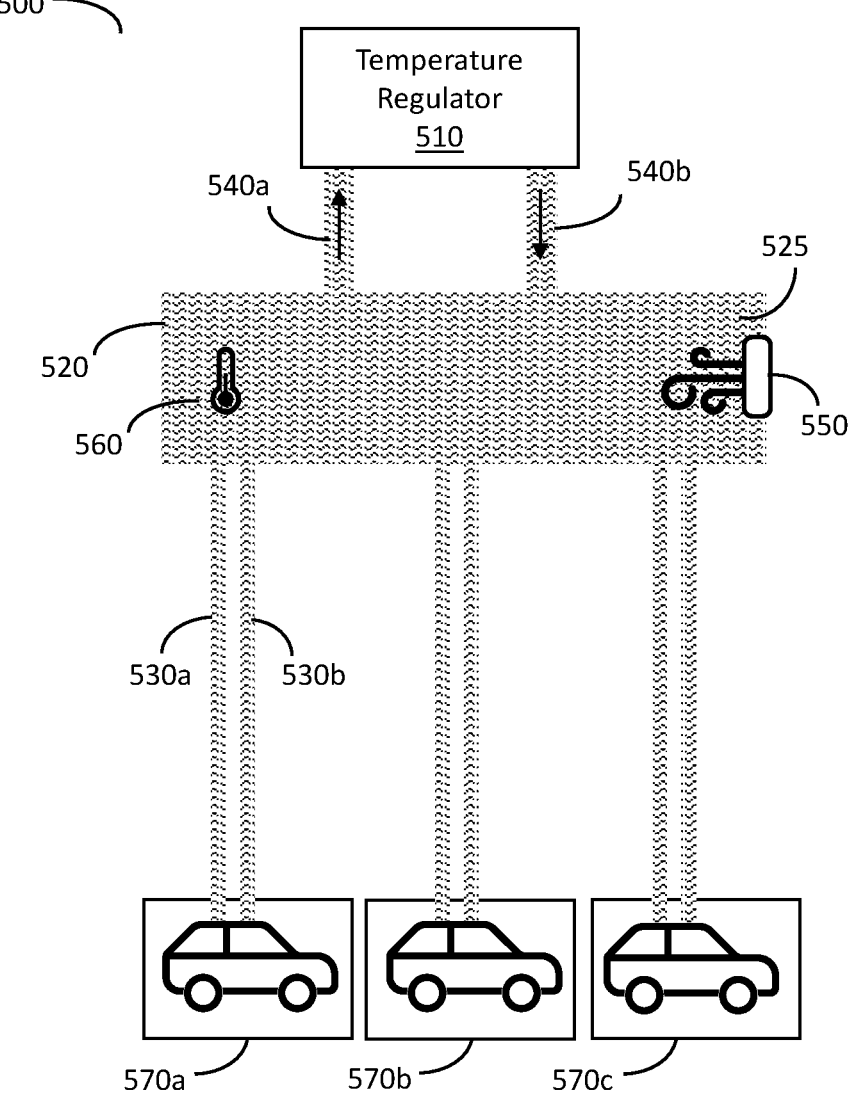
FIG. 5 is an illustration of a third example heat transfer system providing injection cooling, according to some embodiments of the present disclosure.

FIG. 5 is an illustration of a third example heat transfer system providing injection cooling, according to some embodiments of the present disclosure. FIG. 5 includes a temperature regulator 510, which is similar to the temperature regulator 310, and a reservoir 520 holding a heat transfer fluid 525. The reservoir 520 may be open (e.g., a pool in a facility) or fully closed and insulated (e.g., an underground reservoir). The reservoir 520 is coupled to the temperature regulator 510 through a respective input connection 540a and output connection 540b, which are similar to the input connection 340a and output connection 340b described with respect to FIG. 3. The reservoir 520 may include one or more temperature sensors, e.g., temperature sensor 560, which is similar to the temperature sensors 360. The reservoir 520 may include one or more circulators, e.g., circulator 550, which is similar to the circulators 350.

In this example, the reservoir 520 is further coupled to injection cooling sites 570a, 570b, and 570c. Each injection cooling site 570 may also be a charging site, and have an associated charger 130. Each injection cooling site 570 includes a pair of connections 530a and 530b between the reservoir 520 and an EV 110. The EV 110 has an injection cooling channel through which the heat transfer fluid 525 can pass to heat or cool the battery 150 and/or other components of the EV, such as the onboard computer 160. For example, the connection 530a may be an input connection for inputting the fluid into an injection cooling channel of the EV, and the connection 530b may be an output connection for receiving fluid that has passed through the injection cooling channel of the EV 110. Each injection cooling site 570 may have a flow regulator for regulating the speed of flow of the heat transfer fluid 525 through the injection cooling system of the EV. While an injection cooling site and injection cooling channel are referred to herein, it should be understood that, in some circumstances, the same site and channel may be used to heat an EV battery and/or other EV components.

Figure 6:
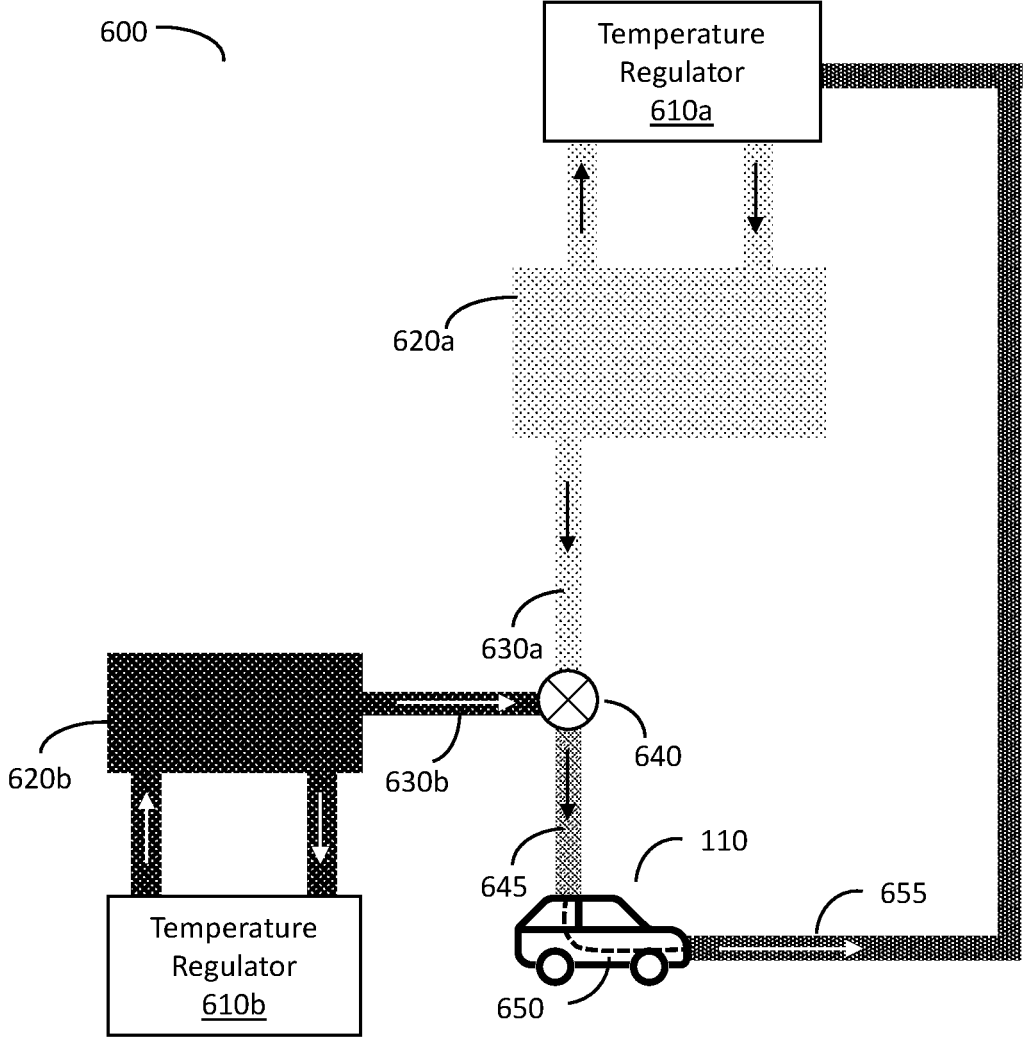
FIG. 6 is an illustration of a fourth example heat transfer system providing injection cooling, according to some embodiments of the present disclosure.

FIG. 6 is an illustration of a fourth example heat transfer system providing injection cooling, according to some embodiments of the present disclosure. In this example, the heat transfer system 600 includes two temperature regulators 610*a* and 610*b*, each coupled to a respective reservoir 620*a* or 620*b*. The reservoirs 620*a* and 620*b* may be set to different temperatures. In this illustration, different shading may be used to illustrate different water temperatures, e.g., the darkest shade in the reservoir 620*b* (e.g., a hot reservoir) is the warmest temperature depicted, while the lighted shade in the reservoir 620*a* (e.g., a cold reservoir) is the coldest temperature depicted. Thus, the temperature regulator 610*b* may heat a heat transfer fluid in the reservoir 620*b*, while the temperature regulator 610*a* cools a heat transfer fluid in reservoir 620*a*.

The two reservoirs 620*a* and 620*b* are each coupled to a fluid mixer 640 that can mix fluid from the two reservoirs 620*a* and 620*b* to produce a mixed output fluid 645 having a desired temperature. The temperature of the mixed fluid 645 may be between the temperature of the heat transfer fluids in the two reservoirs 620*a* and 620*b*. The fluid mixer 640 may be able to regulate speed of flow from each of the two reservoirs 620*a* and 620*b*. The fluid mixer 640 may have one or more temperature sensors, e.g., a temperature sensor to measure the temperature of the mixed fluid 645. The fluid mixer 640 may receive measurements from temperature sensors in the reservoirs 620*a* and 620*b* and determine the mix of the heat transfer fluids from the respective reservoirs 620*a* and 620*b*. Alternatively, the fluid mixer 640 may be externally controlled, e.g., by a system controller for the heat transfer system 600.

The mixed fluid 645 is injected into an injection cooling channel 650 of the EV 110. The injection cooling channel 650 may be similar to the injection cooling channel described with respect to FIG. 5. In this example, an output 655 of the injection cooling channel is returned to the temperature regulator 610*a*, which may cool the heat transfer fluid received from the EV 110 and return the fluid to the reservoir 620*a*. Alternatively, the output 655 of the injection cooling channel may be returned to the temperature regulator 610*b*, to both temperature regulators 610*a* and 610*b*, or one or both of the reservoirs 620*a* and 620*b*. In this example, the shading indicates that the mixed fluid 645 input to the injection cooling channel 650 is cooler than the fluid from the output 655 of the injection cooling channel 650, indicating that the mixed fluid 645 was used to cool the battery and/or other components of the EV 110 (thus resulting in the fluid increasing in temperature).

While FIG. 6 depicts a single EV 110, it should be understood that each of the reservoirs 620*a* and 620*b* may be coupled to multiple fluid mixers 640 for coupling to multiple EVs 110. In another embodiment, one fluid mixer 640 may be configured to be coupled to multiple EVs 110, e.g., to deliver the mixed fluid 645 to multiple EVs 110. In still another embodiment, one or more fluid mixers 640 may be coupled to the same EV 110, e.g., to a first injection cooling channel for the battery 150, and a second injection cooling channel for the onboard computer 160.

In some embodiments, one or both of the reservoirs (e.g., 620*a*) may be replaced with a fluid source, e.g., a water line coupled to a municipal water system, which provides water at a fairly consistent temperature or within a predictable temperature range. In such an embodiment, the temperature regulator (e.g., 610*a*) may be removed, or replaced with an instant-heating or cooling system (e.g., a tankless water heater). For example, the temperature regulator 610*a* and cold reservoir 620*a* are replaced with a cold water tap, and the reservoir 620*b* holds a heat transfer fluid (e.g., a glycol mixture) at a temperature that is warmer than the water from the cold water tap. The fluid mixer 640 mixes water from the cold tap with the heat transfer fluid from the reservoir 620*b* at a ratio to achieve a desired temperature for the EV 110.

While FIG. 6 does not illustrate temperature sensors and circulators as in FIGS. 3-5, it should be understood that temperature sensors, circulators, and/or other equipment for monitoring and controlling the heat transfer system 600 may be included in the heat transfer system 600.

Example Temperature Regulator

Figure 7:
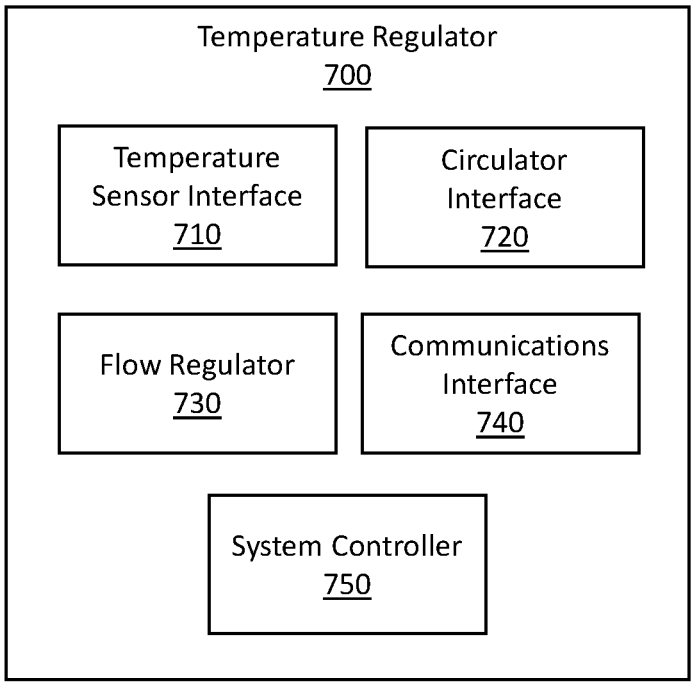
FIG. 7 is a block diagram illustrating a temperature regulator, according to some embodiments of the present disclosure.

FIG. 7 is a block diagram illustrating a temperature regulator 700, according to some embodiments of the present disclosure. The temperature regulator 700 may be one of the temperature regulators 310, 410, 510, or 610 illustrated in FIGS. 3-6.

The temperature regulator 700 includes a temperature sensor interface 710, a circulator interface 720, a flow regulator 730, a communications interface 740, and a system controller 750. In alternative configurations, different and/or additional components may be included in the temperature regulator 700. Further, functionality attributed to one component of the temperature regulator 700 may be accomplished by a different component included in the temperature regulator 700 or a different system than those illustrated. For example, in some embodiments, some or all of the functionality of the temperature regulator 700 is performed by a remote processing system, e.g., the fleet management system 120, or by another device within an EV facility, e.g., a separate heat transfer system controller.

The temperature sensor interface 710 interfaces with any temperature sensors within a heat transfer system, e.g., the temperature sensors illustrated in FIGS. 3-5. For example, the temperature sensor interface 710 may request that temperature sensors measure the local temperature of heat transfer fluid and provide the measurements to the temperature sensor interface 710. The temperature sensor interface 710 receives measurements from the temperature sensors.

The circulator interface 720 interfaces with any circulators within a heat transfer system, e.g., the circulators illustrated in FIGS. 3-5. For example, the circulator interface 720 may provide instructions for circulators to turn on or off; to circulate heat transfer fluid with a particular speed; to change orientation; to change circulation direction (e.g., forwards or backwards, or clockwise or counterclockwise); or to control other aspects of circulation of the heat transfer fluid.

The flow regulator 730 regulates flow of heat transfer fluid throughout the heat transfer system. For example, the flow regulator 730 may regulate flow of heat transfer fluid into or out of the temperature regulator 700, e.g., through the input and output connections 340 or 540. As another example, the flow regulator 730 may regulate flow of heat transfer fluid to a particular EV 110, e.g., through the connections 530 to an injection cooling site 570, or through a fluid mixer 640. In the example shown in FIG. 6, the fluid mixer 640 may receive instructions from the flow regulator 730 to control the mix of heat transfer fluids from the reservoirs 620*a* and 620*b*.

The communications interface 740 is a wired or wireless network connection for connecting the temperature regulator 700 to one or more external devices, e.g., the fleet management system 120, via a network, e.g., a cellular data network or a Wi-Fi network. The fleet management system 120 (e.g., the heat transfer manager 250) may send instructions to the temperature regulator 700, e.g., to heat or cool heat transfer fluid in a reservoir, or to deliver heat transfer fluid at a particular temperature or at a particular flow rate to a particular EV 110. The temperature regulator 700 may transmit information about the heat transfer system to the fleet management system 120 via the communications interface 740. For example, the temperature regulator 700 may transmit temperature measurements from the temperature sensor interface 710 to the fleet management system 120.

The system controller 750 controls operation of the heat transfer system. The system controller 750 receives temperature measurements from the temperature sensor interface 710. The system controller 750 receives instructions provided by the fleet management system 120 via the communications interface 740, and implements the instructions, e.g., by heating or cooling the heat transfer fluid, controlling flow of fluid using the flow regulator 730, etc. For example, if the fleet management system 120 requests that the fluid in the reservoir be set to 2° C., and measurements from the temperature sensors interface 710 indicate that the fluid in the reservoir is at 5° C., the system controller 750 causes the flow regulator 730 to draw fluid into the temperature regulator 700, and a cooling system in the temperature regulator 700 cools the fluid passing through the cooling system. The system controller 750 may also determine to adjust settings of the circulators, and instruct the circulator interface 720 accordingly. For example, the system controller 750 may determine to turn on the circulators while cooling the heat transfer fluid. As another example, the system controller 750 receives data describing EVs currently coupled to the heat transfer fluid, and instructs circulators to circulate fluid accordingly (e.g., to circulate fluid in the arm 330*a* while the EV 110*a* is immersed in the arm 330*a*).

Figure 8:
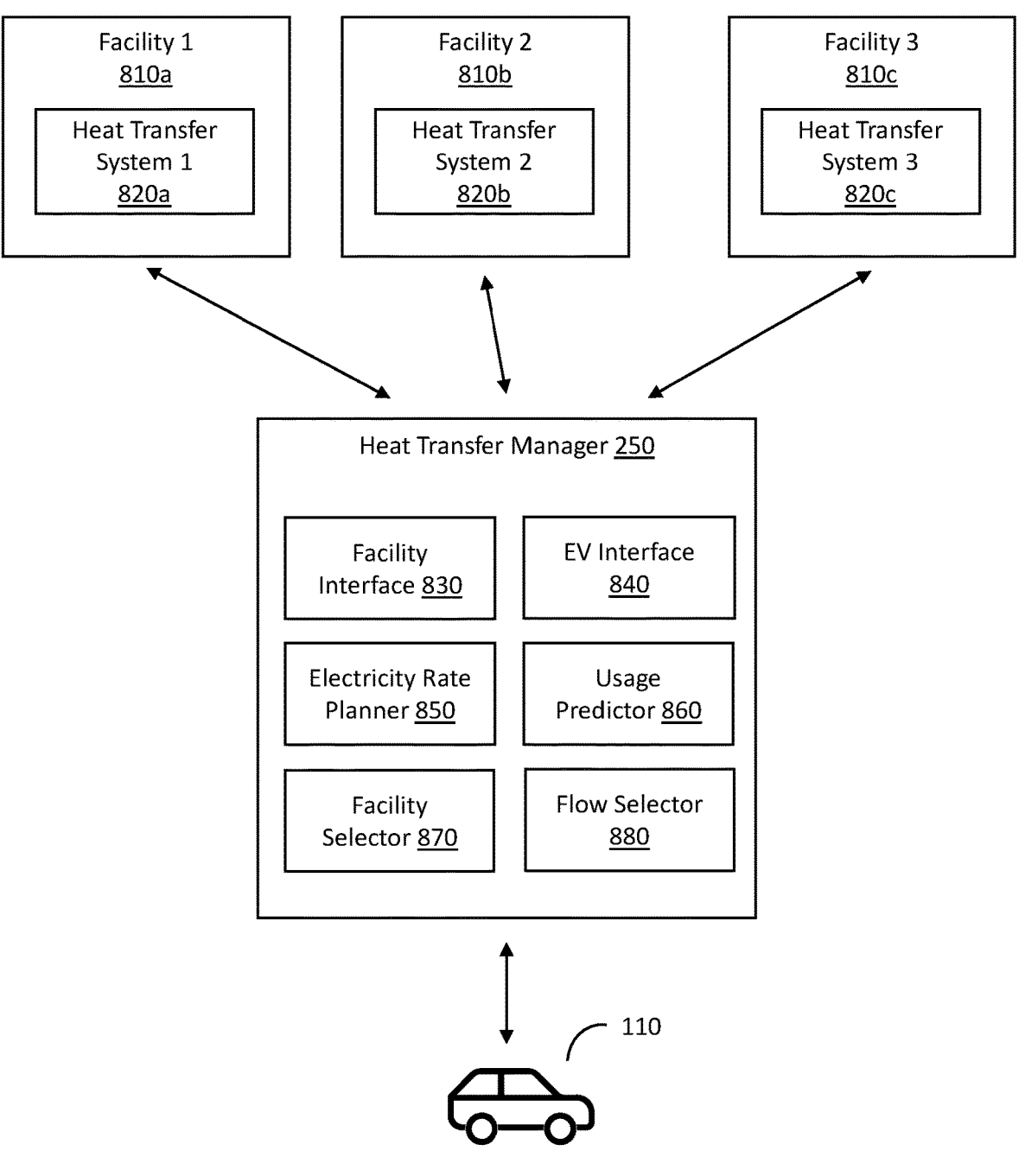
FIG. 8 is a block diagram illustrating a heat transfer manager coupled to multiple charging facilities having heat transfer systems, according to some embodiments of the present disclosure.

Example Heat Transfer Manager Coupled to Charging Facilities with Heat Transfer Systems FIG. 8 is a block diagram illustrating a heat transfer manager 250 coupled to multiple charging facilities having heat transfer systems, according to some embodiments of the present disclosure. In this example, three EV facilities 810 (e.g., charging facilities) each include a heat transfer system, e.g., any of the heat transfer systems 300-600 shown in FIGS. 3-6. One or more of the facilities 810 may also have chargers 130 for charging EVs 110. The facilities 810 are coupled (e.g., via a network connection) to a heat transfer manager 250, which is part of the fleet management system 120, as described with respect to FIG. 2.

The heat transfer manager 250 includes a facility interface 830, an EV interface 840, an electricity rate planner 850, a usage predictor 860, a facility selector 870, and a flow selector 880. The heat transfer manager 250 may be capable of communicating with a fleet of EVs, e.g., the EV 110. In alternative configurations, different and/or additional components may be included in the heat transfer manager 250. Further, functionality attributed to one component of the heat transfer manager 250 may be accomplished by a different component included in the heat transfer manager 250 or a different system than those illustrated.

The facility interface 830 communicates with facilities 810, e.g., the heat transfer systems 820 within the facilities 810. For example, the facility interface 830 may communicate with the communications interface 740 of the temperature regulator 700, as described with respect to FIG. 7. The facility interface 830 may receive data describing the heat transfer systems within the facilities, e.g., current fluid temperatures, usage data (e.g., how many EVs are coupled to a heat transfer system, how many EVS are charging), etc.

The EV interface 840 communicates with EVs 110. The EV interface 840 may receive data from EV temperature sensors, e.g., the temperature sensors 180 shown in FIG. 1. The EV interface 840 may receive additional data, such as a current charge level (both of EVs driving and of EVs charging), an expected time until full charge or a desired charge level is reached (for charging EVs), and current location (both of EVs driving and of EVs charging). The EV interface 840 may transmit instructions to an EV 110 to drive to a particular facility 810 and couple to a particular heat transfer system 820. For example, the EV interface 840 may instruct an autonomous EV 110 to drive to facility 1810*a* and connect to a particular injection cooling site 570 or arm 330 of the heat transfer system 820. Each injection cooling site 570 or arm 330 may be a charging position having an associated charger 130.

The electricity rate planner 850 determines or predicts energy costs for drawing power for heating or cooling a heat transfer fluid. In some embodiments, the electricity rate planner 850 retrieves data describing current and future energy costs (e.g., energy costs for the next 24 hours) from an electricity company or another source. In some embodiments, the electricity rate planner 850 determines anticipated energy costs over a period of time (e.g., the next 12 hours) based on the current energy cost and historical data stored by the electricity rate planner 850 or retrieved from another source. The electricity rate planner 850 may determine different anticipated energy costs for multiple different facilities 810, e.g., charging facilities that receive power from different energy companies may have different rates, and a charging facility that is fully or partially solar powered may have a lower rate or no fee. The electricity rate planner 850 may also assess predicted power generation from renewable sources, e.g., how much solar power is expected to be available over a given time period (e.g., the next 24 hours) based on predicted cloud cover.

The usage predictor 860 determines an expected usage of the heat transfer systems 820 over a future period of time. The usage predictor 860 may receive data describing expected EV utilization, e.g., high utilization may require more charging, and in particular, more fast charging, which can lead to high battery temperatures. The usage predictor 860 may also receive data describing weather patterns, e.g., hot temperatures may lead to higher battery temperatures and more utilization of fluid for cooling, while cold temperatures may lead to low battery temperatures and more utilization of fluid for heating. The usage predictor 860 may receive data from the EV interface 840 describing current status of the EV fleet (e.g., locations, charge levels, battery temperatures, etc.) and general fleet utilization predictions (e.g., from the demand prediction system 230, described with respect to FIG. 2) to predict expected usage of the heat transfer systems 820.

The facility interface 830, discussed above, may instruct one or more of the heat transfer systems 820 to heat or cool heat transfer fluid based on data from the electricity rate planner 850 and/or the usage predictor 860. For example, if energy rates are currently low but expected to increase in the short term (e.g., within an hour, or within a few hours), the facility interface 830 may determine to instruct a heat transfer system 820 to pre-cool or pre-heat its heat transfer fluid, before the energy rate increases. If the reservoir is well-insulated, heating or cooling fluid before it is needed can result in lower cost and more efficient usage of the heat transfer system.

As another example, if utilization of a heat transfer system is currently low, but utilization is expected to increase, the facility interface 830 may determine to instruct a heat transfer system 820 to pre-cool or pre-heat its heat transfer fluid to anticipate the intended use of the heat transfer system. For example, on a cold morning, EVs coming out of overnight storage may have cold batteries, and a heat transfer system 820 can be used to heat the batteries for improved performance and charging. The facility interface 830 can instruct a heat transfer system 820 to pre-heat the heat transfer fluid so that it is ready to heat the cold batteries.

The facility selector 870 selects a particular facility for an EV, e.g., the EV 110. The facility selector 870 may maintain data describing the current use of facilities, e.g., which EVs are positioned at which arms 330 or injection cooling sites 570 at each facility, and what the current status of each EV is (e.g., charge level, time to charge, battery temperature, etc.). The facility selector 870 may also receive data from the usage predictor 860 describing predicted usage for the heat transfer systems 820 in a given geographic area and/or for particular heat transfer systems 820. The facility selector 870 can select a facility for an EV 110 based on this data. For example, the facility selector 870 may determine to put an EV needing heating next to an EV needing cooling, as illustrated in FIG. 4. As another example, if a first facility (e.g., facility 810a) is predicted to receive a surge of EVs coming out of storage at or near the first facility 810a, the facility selector 870 may choose a different facility (e.g., facility 810b) for an EV that is near both facilities 810a and 810b.

As yet another example, the facility selector 870 can select a facility having a heat transfer fluid at a temperature suitable for the EV 110, e.g., based on a target temperature for charging the EV 110. The target temperature may be a temperature for the heat transfer fluid. Alternatively, the target temperature may be a temperature or temperature range for the battery 150, e.g., a temperature range at which the battery has acceptable performance, or a temperature range that avoids degradation. If, for example, a particular EV 110 can receive injection coolant above a minimum coolant temperature, but the current temperature of the heat transfer fluid at one facility 810a is below that minimum temperature, the facility selector 870 can select a different facility (e.g., facility 810a) having a coolant temperature at or above the minimum coolant temperature.

In some embodiments, certain EVs 110 are configured for injection heating and/or cooling, and others for immersion heating and/or cooling. The facility selector 870 may select a facility having the appropriate type of heat transfer system. In some embodiments, the facility selector 870 selects a charging position within the charging facility, as described above, where the charging position is associated with a particular heat transfer position, e.g., an injection cooling site 570 or an arm 330 or 430 of a reservoir 320 or 420.

The flow selector 880 may select a flow of coolant for a particular EV 110, e.g., a flow rate for an injection cooling channel in an EV 110. The flow selector 880 may consider attributes of the EV and of general heat transfer system utilization. A higher flow rate may provide improved heating or cooling, but results in greater use of the heat transfer fluid. For example, the flow selector 880 may select a high flow rate of coolant if an EV 110 is especially hot, or if the EV 110 is charging at a fast charger and expected to become hot. Alternatively, if there is high utilization of the heat transfer systems, or the usage predictor 860 predicts a surge in usage, the flow selector 880 may reduce flow rate to preserve the heat transfer fluid in the reservoir.

The flow selector 880 may control flow during charging of an EV 110, e.g., to reduce or stop flow of the heat transfer fluid if a target temperature for the battery has been reached. For example, an EV 110 may have a target temperature or temperature range, as described above. If the temperature measurement received at the EV interface 840 from the EV 110 indicates that the battery is in the target temperature range, the flow selector 880 may reduce or stop flow of the heat transfer fluid.

Example Method for Selecting a Facility and Changing Battery Temperature

Figure 9:
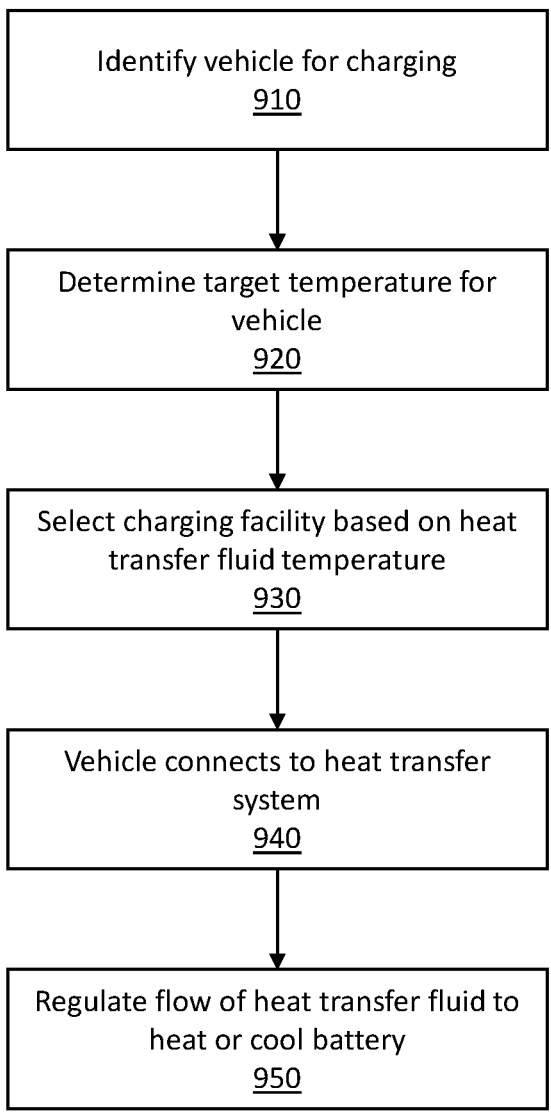
FIG. 9 is a flowchart of an example method for selecting a charging facility for charging an EV and changing the temperature of the EV battery during charging, according to some embodiments of the present disclosure.

FIG. 9 is a flowchart of an example method for selecting a charging facility for charging an EV and changing the temperature of the EV battery during charging, according to some embodiments of the present disclosure. The fleet management system 120 (e.g., the charging manager 240) identifies 910 a vehicle for charging, e.g., an EV 110. The fleet management system 120 (e.g., the heat transfer manager 250) determines 920 a target temperature for the vehicle, e.g., a target coolant or heating fluid temperature, or a target temperature or temperature range for the battery. A particular EV 110 may have a target temperature or temperature range based on the properties of the battery, such as battery type, battery chemistry, battery age, etc. The target temperature may be provided by the EV 110, or the target temperature may be retrieved from a database describing EVs in a fleet.

The fleet management system 120 (e.g., the heat transfer manager 250) selects 930 a charging facility based on a heat transfer fluid temperature at the facility. For example, as shown in FIG. 8, a heat transfer manager 250 (e.g., the facility interface 830) receives data describing the status of heat transfer systems 820 within various facilities 810. The heat transfer manager 250 (e.g., the facility selector 870) selects a particular one of the facilities 810 based on the temperature of heat transfer fluid at the heat transfer system 820, among other various factors (e.g., utilization, expected utilization, costs, location, etc.).

The vehicle connects 940 to the heat transfer system at the selected facility. For example, if the vehicle is an autonomous EV, the EV drives to the selected facility (based on an instruction from the fleet management system). The EV may drive to a particular charging position indicated by the fleet management system. The EV then connects to the heat transfer system, e.g., by driving over a particular arm of the reservoir, or by coupling to an injection cooling system. In some embodiments, an injection cooling system is manually connected by an operator to the EV. In other embodiments, a robotic arm in the facility may connect the injection cooling system to the EV.

The heat transfer system and/or fleet management system regulates 950 flow of the heat transfer fluid to heat or cool the battery of the vehicle. Regulating the flow may involve regulating flow between a reservoir and a temperature regulator connected to the reservoir, e.g., to maintain the fluid in the reservoir at an appropriate temperature. Regulating the flow may involve regulating the speed and/or angle of circulators within the reservoir. Regulating the flow may involve regulating the combination of hot and cold fluid to achieve a desired temperature. Regulating the flow may involve regulating the rate of fluid flow through an injection cooling channel in the vehicle. The flow may be regulated in still other ways, e.g., as described above.

SELECT EXAMPLES

Example 1 provides a method for charging an EV, the method including identifying an EV for charging, the EV having an EV battery for receiving and storing electrical charge determining a target temperature for charging the EV battery; receiving data describing a plurality of charging facilities, at least one of the charging facilities having a heat transfer system for altering a temperature of the battery during charging; selecting a charging facility of the plurality of charging facilities for charging the EV battery based on the target temperature and the received data, the selected charging facility having a heat transfer system; coupling the EV battery to the heat transfer system at the selected charging facility; and regulating flow of a heat transfer fluid from the heat transfer system to the EV.

Example 2 provides the method of example 1, where the heat transfer fluid at the selected charging facility has a first temperature, a second heat transfer fluid at a second one of the plurality of charging facilities has a second temperature, and the charging facility is selected based on the first and second temperatures.

Example 3 provides the method of example 1, where the target temperature is one of a temperature for the heat transfer fluid or a temperature for the EV battery.

Example 4 provides the method of example 1, where the selected charging facility includes a plurality of charging positions, the method further including selecting a first charging position of the plurality of charging positions for the EV, the first charging position selected based on a temperature of the heat transfer fluid at the first charging position.

Example 5 provides the method of example 4, where selecting the first charging position includes identifying a temperature goal of the EV, where the temperature goal is one of heating or cooling the EV battery; identifying a second EV at the selected charging facility, the second EV at a second charging position, the second EV having an opposite temperature goal of the EV; and selecting the first charging position for the EV based on proximity to the second EV at the second charging position.

Example 6 provides the method of example 1, where regulating flow of the heat transfer fluid from the heat transfer system to the EV includes selecting a flow rate for the heat transfer fluid through a fluid channel of the EV; and regulating flow of the heat transfer fluid at the selected flow rate.

Example 7 provides the method of example 1, where regulating flow of the heat transfer fluid from the heat transfer system to the EV includes determining a heat transfer fluid temperature for the EV; mixing the heat transfer fluid with a second heat transfer fluid to obtain a mixed heat transfer fluid at the determined heat transfer fluid temperature; and regulating flow of the mixed heat transfer fluid through a fluid channel of the EV.

Example 8 provides the method of example 1, further including determining an expected demand for heat transfer fluid from one or more EVs; and instructing the heat transfer system at the selected charging facility to alter a temperature of the heat transfer fluid at the selected charging facility based on the expected demand.

Example 9 provides the method of example 8, further including determining an expected cost for heating or cooling the heat transfer fluid; and instructing the heat transfer system at the selected charging facility to alter a temperature of the heat transfer fluid based further on the expected cost.

Example 10 provides a system for charging EVs, the system including a heat transfer system at a charging facility, the heat transfer system to couple to an EV battery and regulate flow of a heat transfer fluid from the heat transfer system to the EV battery; and a charging manager in communication with an EV, the EV including the EV battery for receiving and storing electrical charge, the charging manager to determine a target temperature for charging the EV battery; receive data describing a plurality of charging facilities, at least one of the charging facilities having a heat transfer system for altering a temperature of the battery during charging; and select the charging facility from the plurality of charging facilities for charging the EV battery, the selection based on the target temperature and the received data.

Example 11 provides the system of example 10, where the target temperature is one of a temperature for the heat transfer fluid or a temperature for the EV battery.

Example 12 provides the system of example 10, where the charging facility includes a plurality of charging positions, the charging manager further to select a first charging position of the plurality of charging positions for the EV, the first charging position selected based on a temperature of the heat transfer fluid at the first charging position.

Example 13 provides the system of example 10, where the charging manager is further to select a flow rate for the heat transfer fluid through a fluid channel of the EV, and the heat transfer system is to regulate flow of the heat transfer fluid at the selected flow rate.

Example 14 provides the system of example 10, the heat transfer system including a fluid mixer to mix the heat transfer fluid with a second heat transfer fluid to obtain a mixed heat transfer fluid at a determined heat transfer fluid temperature for the EV, where the heat transfer system is to regulate flow of the mixed heat transfer fluid through a fluid channel of the EV.

Example 15 provides the system of example 10, where the charging manager is further to determine an expected demand for heat transfer fluid from one or more EVs; and instruct the heat transfer system at the charging facility to alter a temperature of the heat transfer fluid at the charging facility based on the expected demand.

Example 16 provides a non-transitory computer-readable medium storing instructions that, when executed by a processor, cause the processor to determine a target temperature for charging a battery of an EV; receive data describing a plurality of charging facilities, at least one of the charging facilities having a heat transfer system to couple to the EV and regulate flow of a heat transfer fluid from the heat transfer system to the battery of the EV; and select the charging facility from the plurality of charging facilities for charging the battery of the EV, the selection based on the target temperature and the received data; and cause an instruction to be transmitted to the EV to drive to the selected charging facility and couple to the heat transfer system at the charging facility.

Example 17 provides the computer-readable medium of example 16, where the heat transfer fluid at the selected charging facility has a first temperature, a second heat transfer fluid at a second one of the plurality of charging facilities has a second temperature, and the charging facility is selected based on the first and second temperatures.

Example 18 provides the computer-readable medium of example 16, where the target temperature is one of a temperature for the heat transfer fluid or a temperature for the EV battery.

Example 19 provides the computer-readable medium of example 16, where the selected charging facility includes a plurality of charging positions, the instructions further to select a first charging position of the plurality of charging positions for the EV.

Example 20 provides the computer-readable medium of example 16, the instructions further to determine an expected demand for heat transfer fluid from one or more EVs; and instruct the heat transfer system at the selected charging facility to alter a temperature of the heat transfer fluid at the selected charging facility based on the expected demand.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for charging an electric vehicle (EV), the method comprising:
   identifying an EV for charging, the EV having an EV battery for receiving and storing electrical charge;
   determining a target temperature for charging the EV battery;
   receiving data describing a plurality of charging facilities;
   selecting a charging facility of the plurality of charging facilities for charging the EV battery based on the target temperature and the received data, the selected charging facility having a heat transfer system for altering a temperature of the EV battery during charging;
   coupling the EV battery to the respective heat transfer system at the selected charging facility; and
   regulating flow of a heat transfer fluid from the heat transfer system to the EV,
   wherein the heat transfer fluid at the selected charging facility has a first temperature, a second heat transfer fluid at a second one of the plurality of charging facilities has a second temperature, and the charging facility is selected based on the first and second temperatures.

2. The method of claim 1, wherein the target temperature is one of a temperature for the heat transfer fluid or a temperature for the EV battery.

3. The method of claim 1, wherein regulating flow of the heat transfer fluid from the heat transfer system to the EV comprises:
   selecting a flow rate for the heat transfer fluid through a fluid channel of the EV; and
   regulating flow of the heat transfer fluid at the selected flow rate.

4. The method of claim 1, wherein regulating flow of the heat transfer fluid from the heat transfer system to the EV comprises:

determining a heat transfer fluid temperature for the EV;

mixing the heat transfer fluid with a second heat transfer fluid to obtain a mixed heat transfer fluid at the determined heat transfer fluid temperature; and regulating flow of the mixed heat transfer fluid through a fluid channel of the EV.

5. The method of claim 1, further comprising:

determining an expected demand for heat transfer fluid from one or more EVs; and instructing the heat transfer system at the selected charging facility to alter a temperature of the heat transfer fluid at the selected charging facility based on the expected demand.

6. The method of claim 5, further comprising:

determining an expected cost for heating or cooling the heat transfer fluid; and instructing the heat transfer system at the selected charging facility to alter a temperature of the heat transfer fluid based further on the expected cost.

7. A method for charging an electric vehicle (EV), the method comprising:

identifying an EV for charging, the EV having an EV battery for receiving and storing electrical charge;

determining a target temperature for charging the EV battery;

receiving data describing a plurality of charging facilities;

selecting a charging facility of the plurality of charging facilities for charging the EV battery based on the target temperature and the received data, the selected charging facility having a heat transfer system for altering a temperature of the EV battery during charging;

coupling the EV battery to the heat transfer system at the selected charging facility; and regulating flow of a heat transfer fluid from the heat transfer system to the EV, wherein the selected charging facility comprises a plurality of charging positions, the method further comprising selecting a first charging position of the plurality of charging positions for the EV, the first charging position selected based on a temperature of the heat transfer fluid at the first charging position.

8. The method of claim 7, wherein selecting the first charging position comprises:

identifying a temperature goal of the EV, wherein the temperature goal is one of heating or cooling the EV battery;

identifying a second EV at the selected charging facility, the second EV at a second charging position, the second EV having an opposite temperature goal of the EV; and selecting the first charging position for the EV based on proximity to the second EV at the second charging position.

9. A system for performing the method of claim 1, the system comprising:

the heat transfer system at the charging facility, the heat transfer system configured to:

couple to the EV battery; and regulate flow of the heat transfer fluid from the heat transfer system to the EV battery; and a charging manager in communication with the EV, the EV comprising the EV battery for receiving and storing electrical charge, the charging manager configured to:

determine the target temperature for charging the EV battery;

receive the data describing the plurality of charging facilities, at least one of the plurality of charging facilities having the heat transfer system for altering the temperature of the EV battery during charging; and select the charging facility from the plurality of charging facilities for charging the EV battery based on the target temperature and the received data.

10. The system of claim 9, wherein the target temperature is one of a temperature for the heat transfer fluid or a temperature for the EV battery.

11. The system of claim 9, wherein:

the charging facility comprises a plurality of charging positions; and the charging manager is also configured to select a first charging position of the plurality of charging positions for the EV, the first charging position selected based on a temperature of the heat transfer fluid at the first charging position.

12. The system of claim 9, wherein the charging manager is also configured to select a flow rate for the heat transfer fluid through a fluid channel of the EV, and the heat transfer system is to regulate flow of the heat transfer fluid at the selected flow rate.

13. The system of claim 9, wherein:

the heat transfer system comprises a fluid mixer to mix the heat transfer fluid with a second heat transfer fluid to obtain a mixed heat transfer fluid at a determined heat transfer fluid temperature for the EV; and the heat transfer system is configured to regulate flow of the mixed heat transfer fluid through a fluid channel of the EV.

14. The system of claim 9, wherein the charging manager is also configured to:

determine an expected demand for heat transfer fluid from one or more EVs; and instruct the heat transfer system at the charging facility to alter a temperature of the heat transfer fluid at the charging facility based on the expected demand.

15. A non-transitory computer-readable medium storing instructions that, when executed by a processor, cause the processor to:

determine a target temperature for charging a battery of an electric vehicle (EV);

receive data describing a plurality of charging facilities;

select the charging facility from the plurality of charging facilities for charging the battery of the EV, the selection based on the target temperature and the received data, the selected charging facility having a heat transfer system to couple to the EV and regulate flow of a heat transfer fluid from the heat transfer system to the battery of the EV; and cause an instruction to be transmitted to the EV to drive to the selected charging facility and couple to the heat transfer system at the charging facility, wherein the heat transfer fluid at the selected charging facility has a first temperature, a second heat transfer fluid at a second one of the plurality of charging facilities has a second temperature, and the charging facility is selected based on the first and second temperatures.

16. The computer-readable medium of claim 15, wherein the target temperature is one of a temperature for the heat transfer fluid or a temperature for the battery.

17. The computer-readable medium of claim 15, wherein:

the selected charging facility comprises a plurality of charging positions; and the instructions also cause the processor to select a first charging position of the plurality of charging positions for the EV.

18. The computer-readable medium of claim 15, the instructions also cause the processor to:

determine an expected demand for heat transfer fluid from one or more EVs; and instruct the heat transfer system at the selected charging facility to alter a temperature of the heat transfer fluid at the selected charging facility based on the expected demand.

\* \* \* \* \*